F. M. JOSLIN.
MANUFACTURE OF PAPER RECEPTACLES.
APPLICATION FILED JULY 20, 1914.

1,181,389.

Patented May 2, 1916.
9 SHEETS—SHEET 6.

F. M. JOSLIN.
MANUFACTURE OF PAPER RECEPTACLES.
APPLICATION FILED JULY 20, 1914.
1,181,389.
Patented May 2, 1916.
9 SHEETS—SHEET 7.
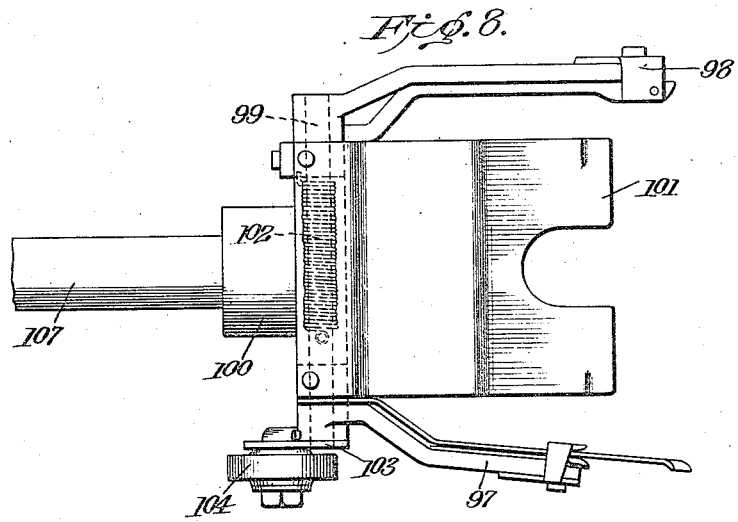
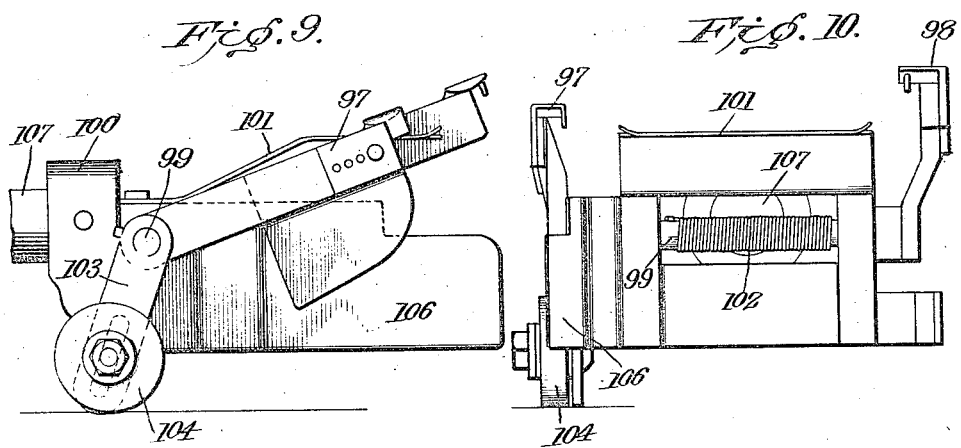

F. M. JOSLIN.
MANUFACTURE OF PAPER RECEPTACLES.
APPLICATION FILED JULY 20, 1914.

1,181,389.

Patented May 2, 1916.
9 SHEETS—SHEET 8.

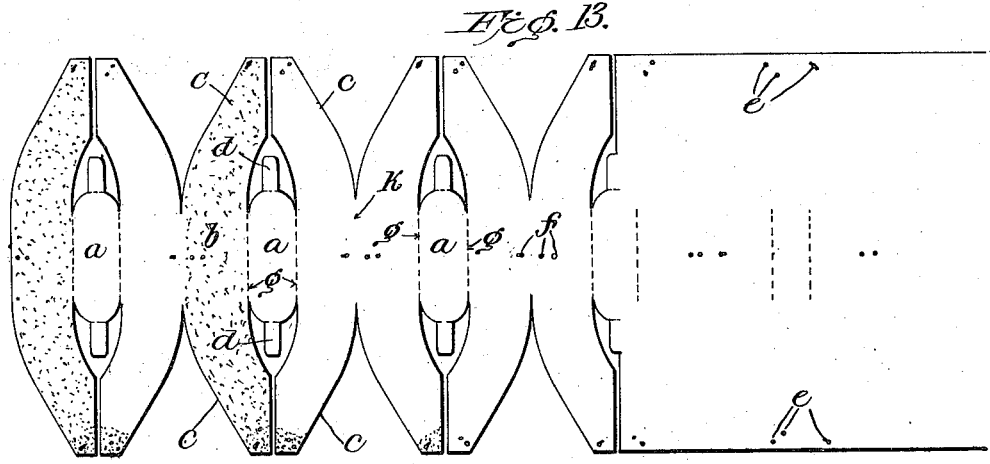
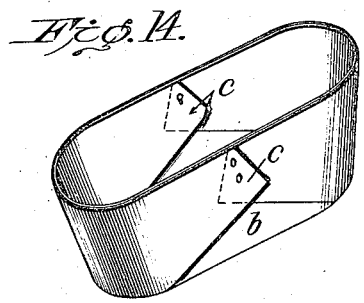
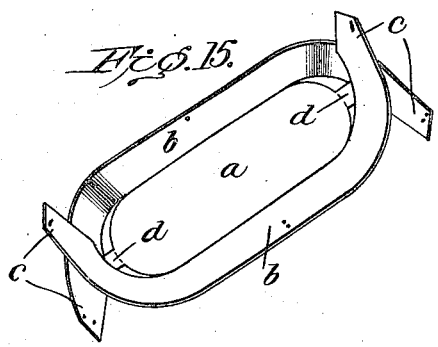
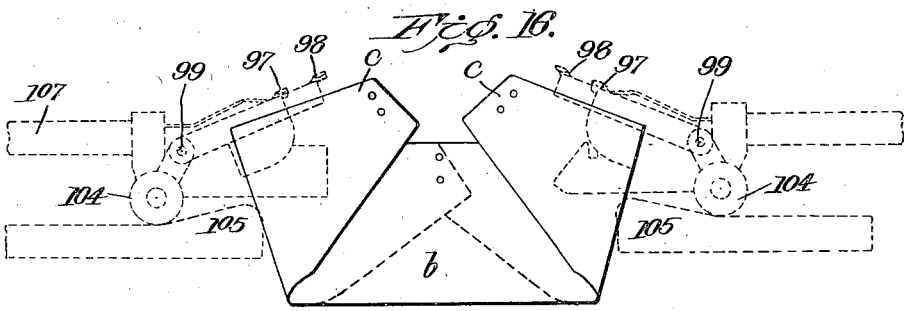

UNITED STATES PATENT OFFICE.

FRANK M. JOSLIN, OF AMSTERDAM, NEW YORK, ASSIGNOR TO INMAN MANUFACTURING CO., INC., OF AMSTERDAM, NEW YORK, A CORPORATION OF NEW YORK.

MANUFACTURE OF PAPER RECEPTACLES.

1,181,389.      Specification of Letters Patent.      Patented May 2, 1916.

Application filed July 20, 1914. Serial No. 852,006.

*To all whom it may concern:*

Be it known that I, FRANK M. JOSLIN, a citizen of the United States, and resident of Amsterdam, county of Montgomery, State of New York, have invented certain new and useful Improvements in the Manufacture of Paper Receptacles, of which the following is a specification.

This invention relates to box making machinery and more particularly to machinery for making boxes or receptacles with rounded ends similar to the common grape basket.

It is the object of the invention to provide a machine for this purpose capable of making boxes or receptacles automatically and at a very rapid rate so that the cost of production will be reduced to a minimum.

Figure 1:
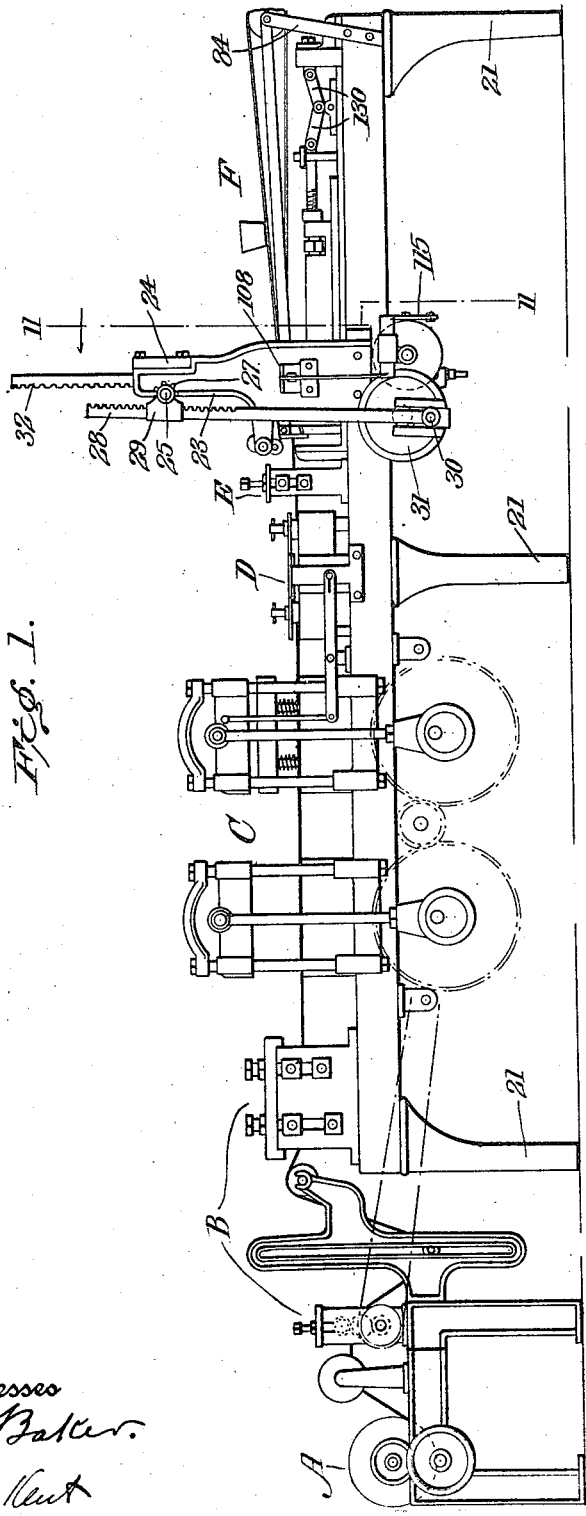
Figure 2:
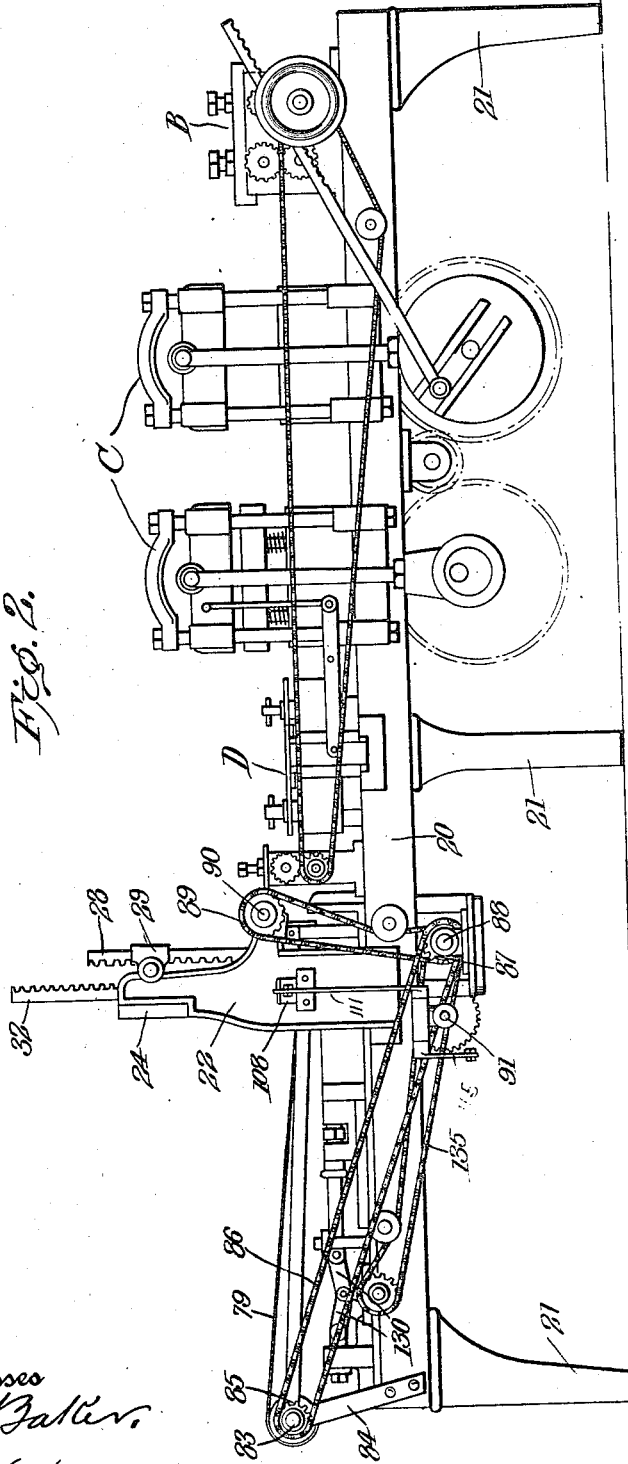
Figure 3:
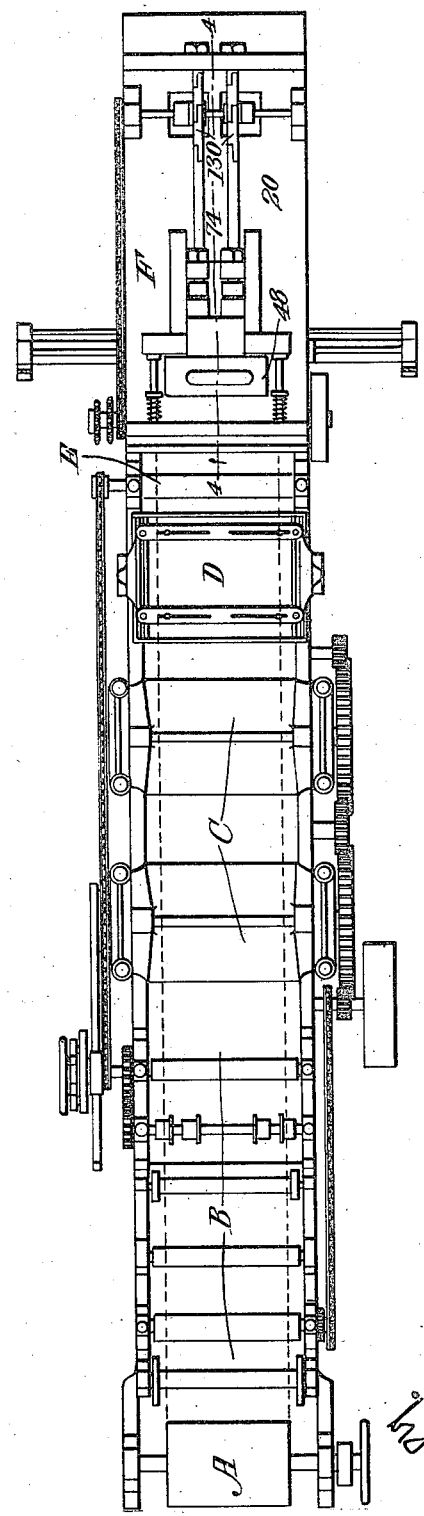
Figure 4:
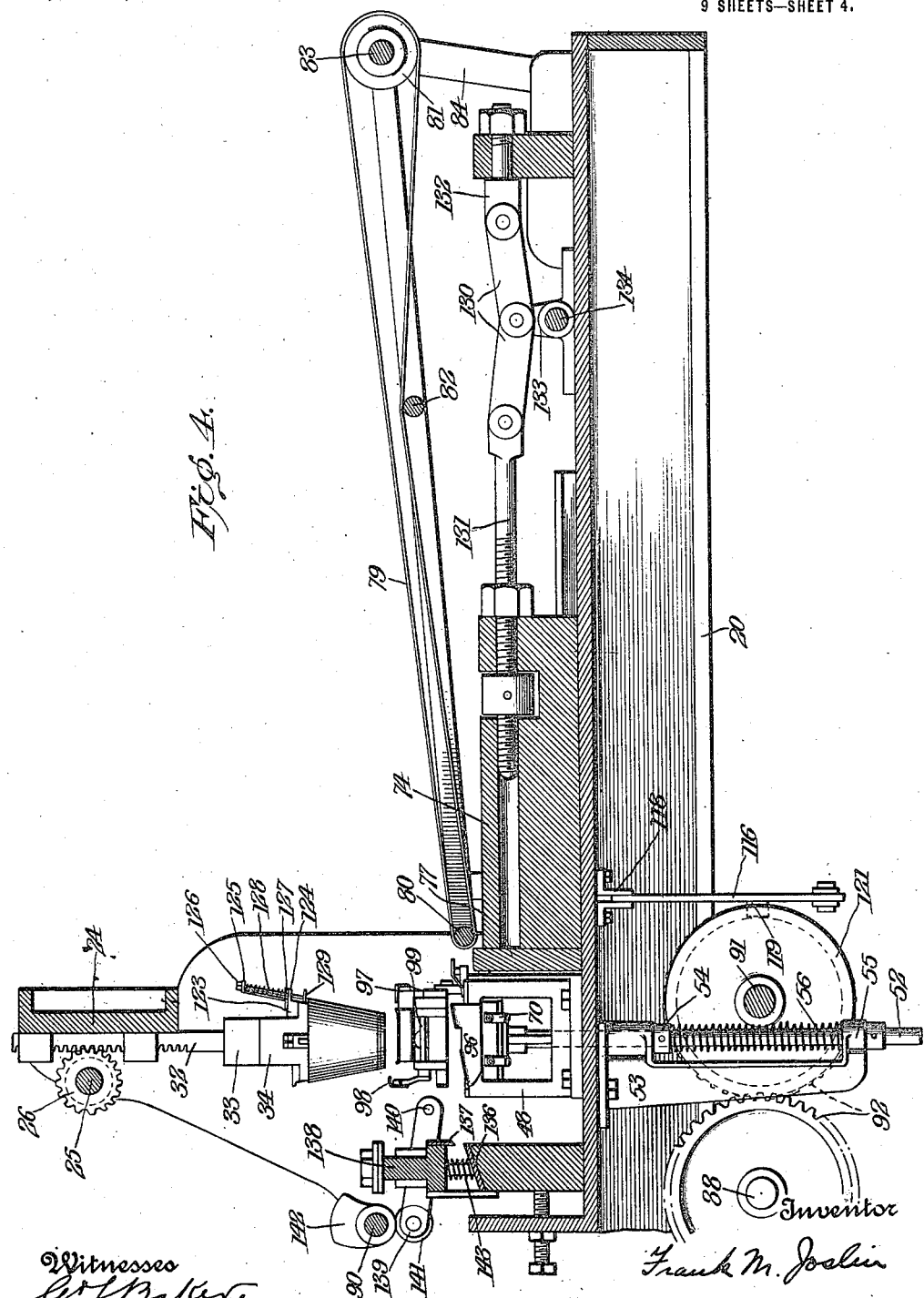
Figure 5:
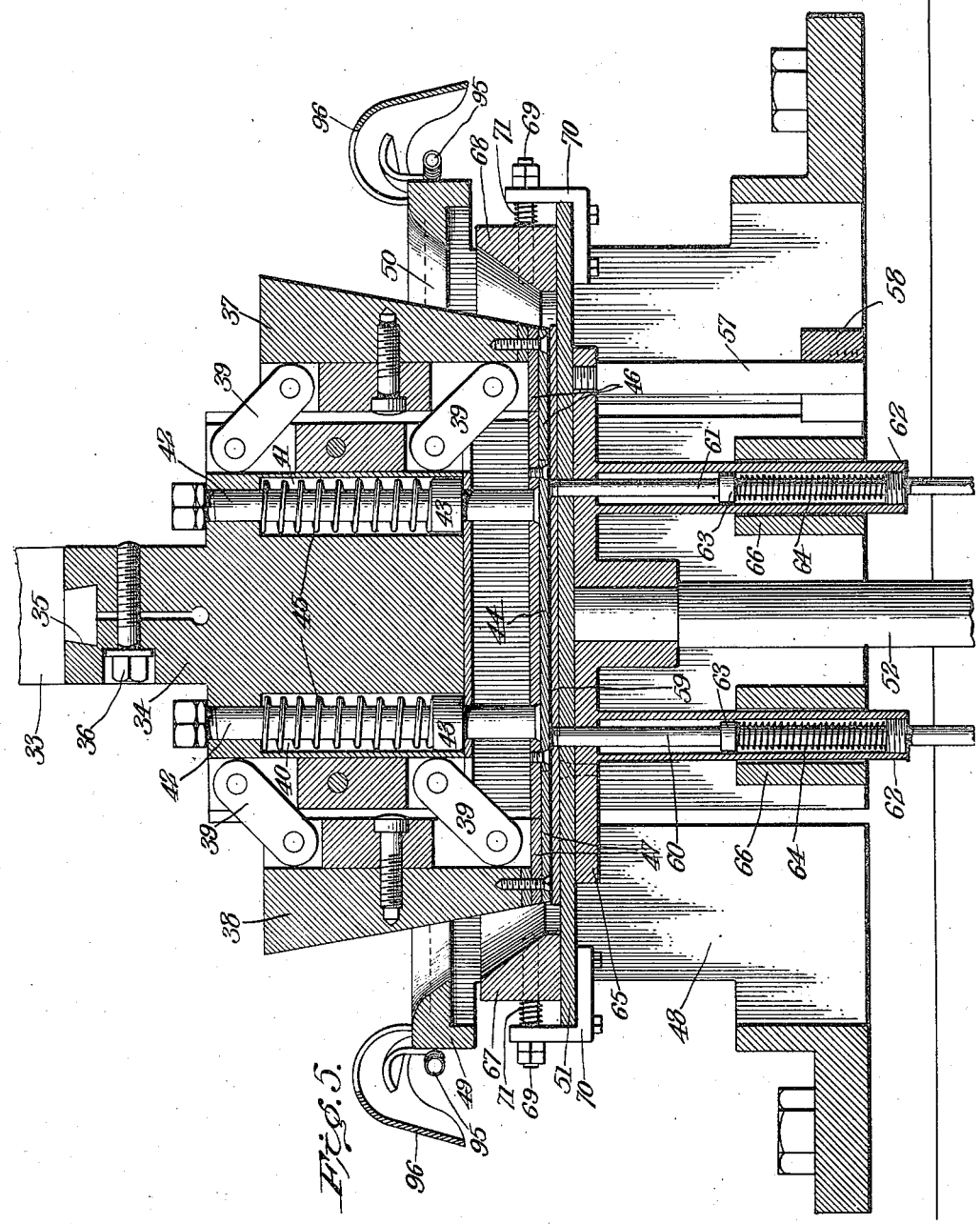
Figure 6:
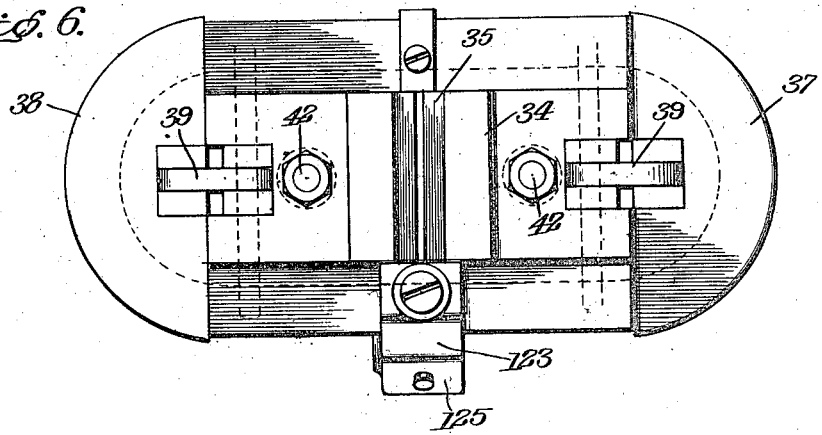
Figure 7:
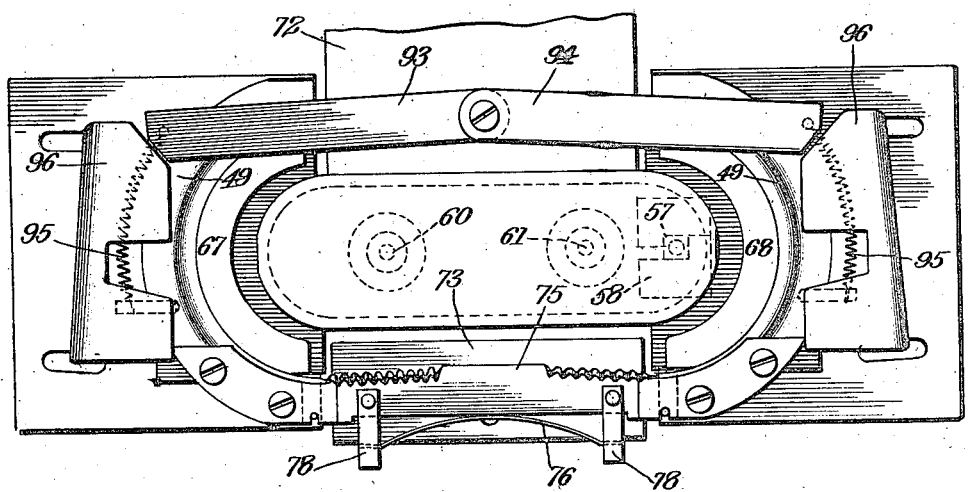
Figure 11:
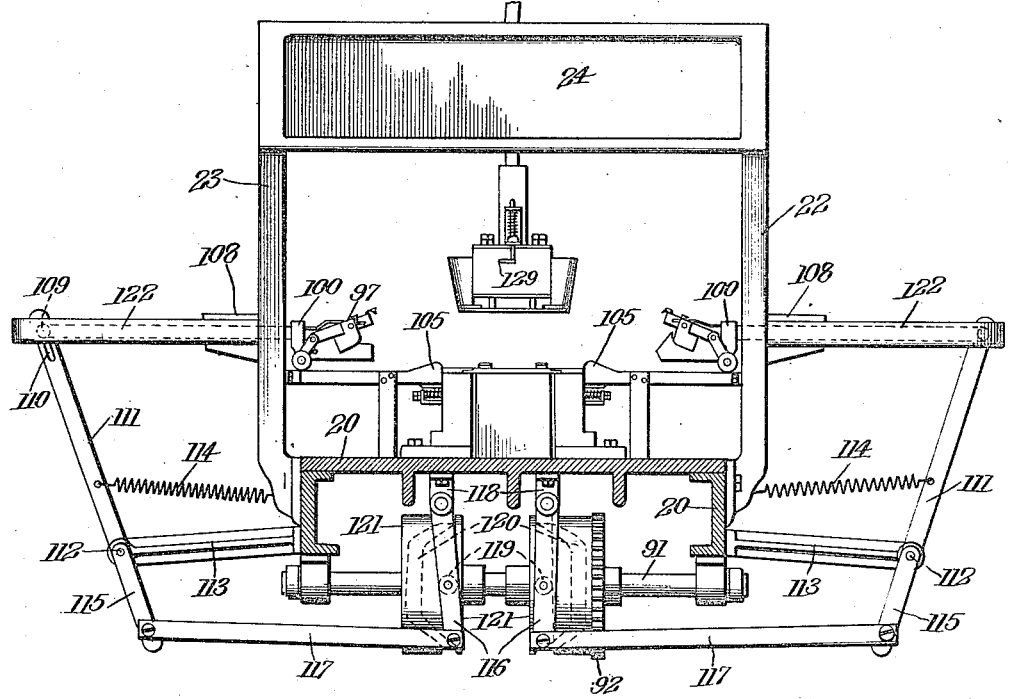
Figure 12:
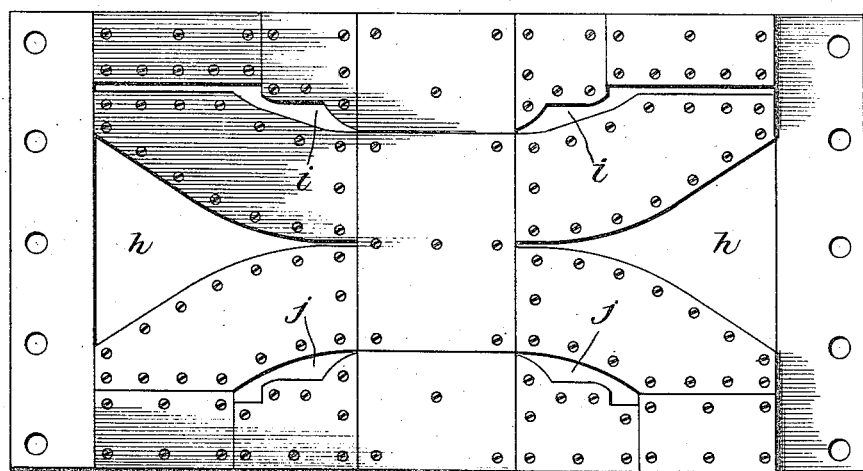

The novel features of the invention will be apparent from the following description taken in connection with the accompanying drawings, in which, Figure 1 is a side elevation of a machine embodying the invention; Fig. 2 is an elevation of the opposite side of the machine; Fig. 3 is a plan view of a machine; Fig. 4 is an enlarged longitudinal section through the forming mechanism; Fig. 5 is a transverse section through the forming dies; Fig. 6 is a plan view of the plunger or male die; Fig. 7 is a plan view of the female die; Fig. 8 is a plan view of one of the devices for positioning the parts of the blanks in the female die; Fig. 9 is a side elevation thereof; Fig. 10 is an end elevation thereof; Fig. 11 is a transverse section substantially on the line 11—11 of Fig. 1; Fig. 12 is a plan of the female die for cutting the blanks; Fig. 13 is a plan of a section of the web from which the blanks are cut; Fig. 14 is a perspective view of the completed basket or receptacle; Fig. 15 is a perspective view of a partially formed basket or receptacle; Fig. 16 is a side elevation of the partially formed receptacle with the positioning fingers for the end of the blank shown in dotted lines.

Referring to Figs. 13, 14 and 15, it will be seen that the blanks are formed from a web of material such as cardboard and consist of a bottom section $a$ to the sides of which are attached the parts $b$ which form the sides of the basket. To the opposite ends of the side sections $b$ are attached the extensions $c$ which are overlapped to form the ends of the basket, the ends of the extensions being arranged along the sides of the basket and being secured thereto. At the opposite ends of the bottom section $a$ there are the tongues $d$ which, in forming the basket, are arranged between the extensions $c$ at the ends of the basket and thus secure the ends of the bottom. In forming the blanks, openings $e$ are made at the ends of the extensions $c$ and openings $f$ are made adjacent the top edges of the sides, these openings registering in the completed basket, as shown in Fig. 14, to receive a wire handle, not shown. The dies which form the blanks make the scores $g$ between the bottom $a$ and the sides $b$ so that the blank may be readily bent along these lines in the forming mechanism.

Referring to Figs. 1, 2 and 3, A indicates a roll of cardboard which is unwound by the feeding mechanism B which may be of any of the constructions commonly used in this art.

C indicates the usual scoring and dieing mechanism, D the pasting mechanism, E a feeding device, and F the forming mechanism.

The general features of the feeding mechanism and the scoring, dieing and pasting mechanisms are shown in the Inman Patents Nos. 996,086 and 1,067,253 and need not be described in this application.

The female blank cutting die is shown in Fig. 12 and is arranged to cut out the triangular pieces $h$ between adjoining blanks and to make the elongated openings $i$ and $j$ in each blank to provide the separate extensions $c$ on each side and the tongues $d$. The pasting mechanism applies the paste to the tongues $d$ and to the underside of the forward half of each blank, as indicated in Fig. 13 and the blanks remain connected, after being formed, by means of a narrow strip $k$ until they reach the forming mechanism F.

The frame 20 of the machine is supported on legs 21 and carries the upright brackets 22 and 23 of the forming mechanism. The upper ends of these brackets are connected by a cross member 24 and have journaled in suitable bearings a shaft 25 which carries a spur gear 26 between the brackets 22 and 23 and a pinion 27 on the outer side of the bracket 23. A rack 28 engages the pinion 27 and has its upper end guided in a slideway 29 which is pivoted on the shaft 25. The rack 28 is reciprocated by means of a crank pin 30 which is adjustable on the disk 31, this construction being generally similar to that shown in Patent No. 1,067,253. The gear 26 meshes with a rack 32 slidably arranged on the cross member 24. The movement given to the rack 28 by the crank pin 30 causes the shaft 25 to be rotated, first in one direction and then in the other and thus reciprocates the rack 32 vertically. The rack 32 carries at its lower end a head 33 to which is attached the body member 34 of the male die or plunger. The head 33 is provided with a dove-tail 35 and the body member 34 has a corresponding opening and is secured to the dove-tail by a clamping screw 36 (see Fig. 5). At the ends of the member 34 are the members 37 and 38 which are each connected with the member 34 by a pair of links 39. The links 39, as will be seen from Fig. 5, are parallel and will give a parallel motion to the members 37 and 38. The member 34 is provided with the cylindrical pockets 40 and 41 through which pass the bolts 42 having the collars 43 and having their lower ends secured to the bottom member 44 of the plunger. Springs 45 surround the bolts 42 in the pockets 40 and 41 and engage the collars 43. These springs yieldingly hold the bottom member 44 in the position shown in Fig. 5. The member 37 has secured to the bottom thereof the plates 46 which have a sliding connection with the plates forming the bottom member 44 of the plunger and when the bottom 44 is moved toward the body member 34 of the plunger the member 37 will be moved with it and will also be moved outwardly on account of the action of the links 39. The member 38 has secured to its lower end the plates 47 which are similar to the plates 46 and cause the member 38 to be moved simultaneously with the bottom 44.

From the above it will be evident that the bottom member 44 of the plunger is yieldably held in its lower position, shown in Fig. 5, by the springs 45, and when the plunger descends and the bottom 44 meets a resistance sufficient to overcome the tension of the springs 45, the latter will be compressed by the movement of the body member 34 toward the bottom and simultaneously the members 37 and 38 will be moved outwardly. This construction provides an expansible plunger which will press the ends of the receptacle, being formed, outwardly to their proper position.

The plunger just described coöperates with a female die comprising a hollow body member 48 which is secured to the bed 20 of the machine. The body member 48 has a top plate 49 with an oval opening 50 through which the blank is pressed in forming the basket. The female die has a bottom plate 51 which is carried by a bracket 65 and rod 52 slidably arranged in a bracket 53. The rod 52 carries a collar 54 and between this collar and the lower bearing 55 of the bracket is a spring 56 which yieldably supports the bottom 51 in the position shown in Fig. 5. The plate 51 has secured thereto a square rod 57 which is slidably arranged in a bearing 58 and serves as a guide for the plate 51 to prevent lateral movement thereof. Arranged above the plate 51 is a plate 59 to which is secured the rods 60 and 61. These rods are guided in suitable tubular members 62 on the underside of the bracket 65 and have collars 63 which serve as abutments for springs 64, these springs normally pressing the rods 60 and 61 and the plate 59 upwardly. The normal position of the plate 59, when the plunger is elevated, is substantially on a level with the upper side of the top 49 and when the plunger descends, the plate 59 is pushed downwardly against the plate 51, as shown in Fig. 5, the springs 64 being thereby compressed. When the plate 59 engages the plate 51 further downward movement of the plunger depresses both plates and compresses the spring 56. The limit of movement of the plates 51 and 59 is reached when the underside of the bracket 65, to which the plate 51 is permanently secured, engages the upper ends of the sleeves 66, these sleeves being secured to the body 48. Further downward movement of the body member 34 of the plunger after the plate 51 has reached its limit, causes the members 37 and 38 of the plungers to be moved outwardly and the body member to approach the bottom member 44 in the manner hereinabove described. On the return movement of the plunger the body member 34 first recedes from the bottom member 44 and draws the members 37 and 38 inwardly from the position shown in Fig. 5.

Slidably arranged on the plates 51 are the semi-circular members 67 and 68 which have secured thereto the rods 69, these rods being slidably arranged in brackets 70 which are secured to the plate 51. Between the brackets 70 and the members 67 and 68 springs 71 are coiled on the rods 69 and press the members 67 and 68 inwardly. When the plate 51 reaches the limit of its downward movement and the members 37 and 38 of the plunger move outwardly, the members 67 and 68 yield sufficiently to permit the members 37 and 38 to move to their limiting position and the members 38 and 67 coöperate to press the parts of the blanks forming one end of the basket together and the members 37 and 68 coöperate to press the parts of the blank forming the opposite end of the basket together.

The limit of upward movement of the plate 51, as the plunger is withdrawn, is reached when the members 67 and 68 engage the underside of the top 49 of the female die and after the plate 51 reaches this limit the plate 59 continues to move upwardly with the plunger until the collars 63 engage the bracket 65 at the upper ends of the tubular members 62. In this manner the formed basket is ejected from the female die and after the plate 59 reaches the limit of its upward movement the plunger continues its upward movement while the basket remains on the plate 59.

Referring to Fig. 7, it will be observed that the rearward side 72 of the die is fixed and the forward side 73 thereof is movable and secured to a slide 74 arranged on the bed 20 (see also Fig. 4). On the upper side of the movable side 73 of the die is a plate 75 having its rearward edge serrated so that when the plunger forces the blank into the die the pasted underside of the blank, which engages the edge of the plate 75, will not have the paste scraped therefrom. On the forward edge of the plate 75 is a spring 76 which engages a plate 77 on the slide 74 to yieldably hold the plate 75 and permit the latter to be moved forwardly when the plunger enters the die. Secured to the upper side of the plate 75 are the upwardly bent ways 78 which guide the formed basket as it is moved by the next succeeding blank forwardly to the belt 79. The belt 79 runs over pulleys 80 and 81 and a guide pulley 82. The pulley 81 is arranged on a shaft 83 which is supported on brackets 84 and is driven by a sprocket wheel 85 and a chain 86. The chain 86 is driven by a sprocket wheel 87 on the shaft 88. The shaft 88 is driven by any suitable mechanism and by means of a chain 89 drives the shaft 90 which is supported on the brackets 22 and 23. A shaft 91 is driven from the shaft 88 by means of a pair of gears 92.

The rearward side 72 of the die has pivoted to the upper side thereof bars 93, 94, the outer ends of which are drawn forwardly by springs 95. The blank is received above the die and pressed into the die, to be formed into the basket, by the plunger, and the bars 93 and 94 coöperate with the plunger to turn one side of the blank upward. The other side of the blank is turned upward by the plate 75 and the extensions c are overlapped around the ends by means of the curved forming plates 96 which are carried on the top 49 of the die. When the blank has been pressed into the die the ends of the extensions c project above the top of the basket somewhat as indicated in Fig. 16, and for the purpose of pressing these ends down into their proper position oppositely arranged pairs of fingers 97, 98 are moved inwardly from the sides of the machine and engage the upper edges of the extensions c. The fingers 97 and 98 are carried by shafts 99 and these shafts are arranged in the reciprocating carriers 100. These carriers are also provided with plates 101 which coöperate with the plunger and die to properly position the extensions c. Springs 102 are coiled on the shafts 99 and arranged to lift the fingers 97 and 98. For the purpose of depressing the fingers the shafts 99 carry the arms 103 having at their lower ends cam rollers 104 adapted to engage cams 105 as the carriers are moved inwardly. The operations of these parts will be readily understood from Figs. 11 and 16. The carriers 100 are also provided with side plates 106 which engage the exposed extensions c and wrap the same against the sides of the basket and into alinement with the fingers 97 so that the latter will engage these extensions and depress them. The carriers 100 are arranged on reciprocating rods 107 which slide in brackets 108 on the brackets 22 and 23. The outer ends of the rods 107 are provided with pins 109 engaging slots 110 in the upper ends of the oscillating arms 111, these arms being carried by shafts 112 which are supported on brackets 113. The arms 111 have springs 114 connected therewith and these springs normally tend to draw the arms toward the machine as will be readily understood from Fig. 11. The shafts 112 also carry downwardly projecting arms 115 which have their lower ends connected with levers 116 by means of links 117. The levers 116 have their upper ends pivotally connected with brackets 118 on the under side of the bed 20 and carry rollers 119 which engage cam grooves 120 on the wheels 121, these wheels being secured on the shaft 91. From Fig. 11 it will be evident that the rotation of the shaft 91 will cause the carriers 100 to be moved to and fro laterally of the path of movement of the plunger. Guards 122 are provided around the paths of movement of the upper ends of the levers 111.

In order to insure that the formed basket will be detached from the plunger when the latter moves away from the plate 59, there is provided on the body member 34 of the plunger a bracket 123 having spaced bearings 124, 125, through which slides a rod 126. The rod 126 carries a collar 127 and between this collar and the bearing 125 a spring 128 is coiled around the rod 126 and presses the rod downwardly. At the lower end of the rod is a foot 129 which is adapted to engage the upper edge of the basket before the plunger reaches the limit of its downward movement. The engagement of the foot 129 with the upper edges of the extensions c causes these extensions to be arranged in overlapping relation and flush with the upper edge of the basket, the spring 128 being compressed and holding the parts in proper relation while the slide 74 is acting.

The slide 94 is actuated by any suitable mechanism, preferably by mechanism similar to that shown in Patent No. 996,086, this mechanism consisting of pairs of toggle links 130, one of the links of each pair being connected with an adjustable rod 131 secured to the slide 74 and the other being connected with a fixed bolt 132. The toggles are actuated by cams 133 on a shaft 134 and this shaft is actuated from the shaft 88 by means of a chain 135.

The blanks are severed from the web after the plunger descends sufficiently to secure the blank between the bottom plate 44 of the plunger and the plate 59 and for the purpose of severing the blanks there is provided a fixed cutter 136 and a movable cutter 137 carried by a reciprocating head 138. The head 138 is reciprocated by means of a lever 139 which is pivoted at 140 and carries a cam roller 141, the cam roller being in engagement with a cam 142 on the shaft 90 so that as the shaft rotates the lever 139 will be swung downwardly to sever the blanks and then permit the head 138 to be raised by means of the spring 143. This construction is substantially the same as that shown in Patent No. 996,086.

From the foregoing description it will be seen that I have provided a machine which is capable of making baskets or receptacles such as is illustrated in Fig. 14, from a continuous web of material. It will be understood that the invention is not limited to the exact details of construction shown and described herein and that certain features of the invention may be used in other relations.

Having described my invention what I claim and desire to secure by Letters Patent is, 1. In a machine of the class described, the combination of, means for feeding a web of material, scoring and dieing mechanism for forming blanks having sides with end extensions adapted to be overlapped to form a receptacle with rounded ends, pasting mechanism, and forming mechanism comprising a die, a plunger adapted to press the blanks into said die, means for pressing the ends of said extensions into position along the sides of the receptacle, and means for applying pressure to the sides of the receptacle to secure the pasted portions.

2. In a machine of the class described, the combination of, means for feeding a web of material, scoring and dieing mechanism for forming blanks having sides with end extensions adapted to be overlapped to form a receptacle with rounded ends, pasting mechanism, and forming mechanism comprising a die having yieldable end pieces and a yieldable side piece, a plunger adapted to press the blanks into said die and longitudinally expansible to press said overlapped extensions together, and means for moving said yieldable side of the die to secure the ends of said extensions to the side portions of the blanks.

3. In a machine of the class described, the combination of means for feeding a web of material, scoring and dieing mechanism for forming a blank having a bottom portion, side portions attached thereto and provided with extensions at the ends thereof, and tongues attached to the ends of the bottom portion and separate from said extensions, means for applying adhesive material to one of said sides and some of said extensions, and forming mechanism comprising a die and a plunger, said die having parts adapted to fold said extensions into overlapped arrangement with said tongues between, to form the ends of the receptacle, and means of compressing the sides of the receptacle to secure the parts thereof together.

4. In a machine of the class described, the combination of means for feeding a web of material, scoring and dieing mechanism for forming a blank having a bottom portion, side portions attached thereto and provided with extensions at the ends thereof, and tongues attached to the ends of the bottom portion and separate from said extensions, means for applying adhesive material to one of said sides and some of said extensions, and forming mechanism comprising a die having yieldable ends and yieldable sides, an automatically expanding plunger, means for positioning the ends of said extensions on the sides of the receptacle, and means for moving said yieldable side of the die to compress the sides of the receptacle to secure the sides thereof together.

5. In a machine of the class described, the combination of a die having a yieldable bottom, a reciprocating plunger for pressing the blanks into said die, means movable independently of said plunger and coöperating therewith to position the blank in said die, and means for moving said bottom, on the return stroke of said plunger, to eject the receptacle from said die.

6. In a machine of the class described, the combination of a die, a reciprocating plunger for pressing the blanks into said die, members arranged on opposite sides of said die and movable to and fro thereover, presser members pivoted on said members and cam means for swinging said presser members into engagement with parts of the blanks to position said parts in said die.

7. In a machine of the class described, the combination of a die, a reciprocating plunger for pressing the blanks into said die, members arranged on opposite sides of and above said die, cam means for moving said members to and fro above said die in time with the movements of said plunger, means carried by said members for engaging parts of the blanks and positioning the same in said die, and cams for actuating said means independently of said members.

8. In a machine of the class described, the combination of a die and a plunger coöperating therewith and comprising a body member, a spring pressed bottom member movable relatively to said body member, end members, and parallel links connecting said end members to said body member.

9. In a machine of the class described, the combination of a plunger and a die, the latter comprising a hollow body member, a bottom member yieldably supported, end members carried by said bottom member and movable therewith, and spring pressed members at the top of the body member and adapted to coöperate with said plunger to position the sides and ends of the blanks.

10. In a machine of the class described, the combination of a plunger and a die, the latter comprising a hollow body member, a spring supported bottom member, end members and a spring pressed plate at the top of the body member and having a serrated blank engaging edge coöperating with said plunger to position parts of the blanks in the body member.

In testimony whereof I affix my signature in presence of two witnesses.

FRANK M. JOSLIN.

Witnesses:
  JAMES W. FERGUSON,
  CHAS. HUBBS.